United States Patent Office 3,766,272
Patented Oct. 16, 1973

3,766,272
4,4'-METHYLENEDI(CYCLOHEXYLAMINE) ISOMERIZATION OVER A SUPPORTED CATALYST
Loren D. Brake, Wilmington, Del., assignor to E. I. du Pont de Nemours and Company, Wilmington, Del.
No Drawing. Continuation of application Ser. No. 11,829, Feb. 16, 1970, which is a continuation-in-part of application Ser. No. 691,994, Dec. 20, 1967, which is a continuation-in-part of application Ser. No. 587,980, Oct. 20, 1966, which in turn is a continuation-in-part of application Ser. No. 516,092, Dec. 23, 1965, all now abandoned. This application Aug. 25, 1972, Ser. No. 283,745
Int. Cl. C07c 87/32
U.S. Cl. 260—563 B
8 Claims

ABSTRACT OF THE DISCLOSURE

A mixture of the stereoisomers of 4,4'-methylenedi-(cyclohexylamine) not at equilibrium is converted to a mixture of stereoisomers approaching equilibrium ratio by heating the mixture of stereoisomers to a temperature of from 150° to 300° C. in the presence of hydrogen at a partial pressure of from 50 to 5500 pounds per square inch and at a total pressure of from 500 to 15,000 pounds per square inch in the absence of added ammonia and in the presence of from 0.001 to 10 weight percent of ruthenium catalyst, calculated as ruthenium metal and based on the starting weight of mixed isomers, the ruthenium being supported on an inert carrier selected from the group consisting of calcium carbonate, rare earth oxides, rare earth carbonates and mixed rare earth oxide-carbonates.

CROSS-REFERENCE TO RELATED APPLICATIONS

This application is a continuation of my copending application Ser. No. 11,829, filed Feb. 16, 1970, now abandoned, which in turn was a continuation-in-part of my then copending application Ser. No. 691,994, filed Dec. 20, 1967, now abandoned, which in turn was a continuation-in-part of my then copending application Ser. No. 587,980, filed Oct. 20, 1966, now abandoned, which in turn was a continuation-in-part of my application Ser. No. 516,092, filed Dec. 23, 1965, now abandoned.

BACKGROUND OF THE INVENTION

This invention relates to an improvement in the process for isomerizing 4,4'-methylenedi(cyclohexylamine) not at equilibrium to a mixture of stereoisomers approaching the equilibrium ratio under hydrogen pressure, the improvement comprising carrying out the isomerization reaction in the absence of added ammonia with a ruthenium catalyst supported on an inert carrier selected from the group consisting of calcium carbonate, rare earth oxides, rare earth carbonates and mixed rare earth oxide-carbonates.

It is disclosed in the art that a mixture of the stereoisomers of PACM not at equilibrium is converted to a mixture of stereoisomers approaching equilibrium ratio by heating the mixture of stereoisomers in the presence of added ammonia at a temperature of 180° C. to 250° C. in the presence of hydrogen at a partial pressure above about 500 pounds per square inch in the presence of a ruthenium catalyst. See Arthur U.S. Pat. No. 3,177,258.

The discovery that it is possible to take a single stereoisomer of the three stereoisomers of PACM or a mixture of any two or all three of these stereoisomers, characterized in that such isomer or mixture of isomers is at a concentration other than the equilibrium concentration or equilibrium ratio of the isomer or isomers, and subjecting this to the conditions of the process of the Arthur patent whereby the stereoisomer or mixture of stereoisomers is adjusted in concentration or ratio closer to the equilibrium concentration or ratio, made it unnecessary to discard previously unwanted mixtures of the PACM stereoisomers.

I have now discovered that the use of a ruthenium catalyst supported on an inert carrier selected from the group consisting of calcium carbonate, rare earth oxides, rare earth carbonates and mixed rare earth oxide-carbonates in the absence of added ammonia results in a surprising reduction in the by-product formation in the isomerization process for PACM.

It is important to emphasize that the use of calcium carbonate, rare earth oxides, rare earth carbonates, or mixed rare earth oxide-carbonates as carriers for ruthenium in the process of this invention results in a surprising reduction in the formation of undesirable by-products when compared with other carriers such as carbon, alumina, silica alumina, kieselguhr, and the like. The improvement is even more striking when the comparison is carried out in the absence of added ammonia.

It is also important to emphasize that the process of this invention does not require the addition of ammonia to obtain high yields as required in the prior art. A process which does not require the addition of ammonia has obvious advantages, the foremost being that further processing can be carried out directly on the reactor effluent without a necessary intermediate step to remove the dissolved ammonia. The process of this invention has the advantage of not requiring ammonia injection and recovery facilities nor operations.

SUMMARY OF THE INVENTION

In summary this invention is directed to an improvement in the process for isomerizing a mixture of the stereoisomers of PACM not at equilibrium ratio such that the isomer mixture is brought closer to the equilibrium ratio by subjecting the isomer mixture to hydrogen at a partial pressure of from 50 to 5500 pounds per square inch and a total pressure of 500 to 15,000 pounds per square inch at a temperature of from 150 to 300° C., the improvement comprising carrying out the process in the absence of added ammonia and in the presence of from 0.001 to 10 percent of ruthenium catalyst based on the weight of mixed isomers and calculated as metallic ruthenium, said catalyst being supported on a carrier selected from the group consisting of calcium carbonate, rare earth oxides, rare earth carbonates and mixed rare earth oxide-carbonates.

By this procedure a mixture of PACM stereoisomers rich in cis, cis-stereoisomer is brought to a ratio of stereoisomers approaching equilibrium as is a mixture of PACM stereoisomers rich in the cis,trans-stereoisomer or the trans,trans-stereoisomer or any single stereoisomer.

DESCRIPTION OF THE INVENTION

According to the broad concept of this invention, I have discovered that it is possible to take a single stereoisomer of the three stereoisomers of PACM, or a mixture of any two or all three of these stereoisomers, characterized in that such stereoisomer or mixture of stereoisomers is at a concentration other than the equilibrium concentration or equilibrium ratio of the stereoisomers, and subjecting this PACM to a temperature of from 150° to 300° C. at an elevated pressure in the absence of added ammonia, and in the presence of hydrogen and a ruthenium catalyst supported on calcium carbonate, single or mixed rare earth oxides, rare earth carbonates or mixed rare earth oxide-carbonates, whereby the stereoisomer or mixture of stereoisomers is adjusted in concentration or ratio closer to the equilibrium concentration or ratio, and in a preferred embodiment, to a concentration or ratio approaching equilibrium.

It will be clearly understood that the starting materials in the process of this invention are hydrogenated saturated stereoisomers of 4,4' - methylenedi(cyclohexylamine).

It will also be understood that the expressions "equilibrium concentration" and "equilibrium ratio" are used in their conventional sense to mean the relative proportion of stereoisomeric PACM components in any given PACM product, wherein the stereoisomeric component or components are present in a state of greatest stereoisomer stability and lowest free energy. For the three stereoisomers of PACM, the equilibrium concentration, as well as can be determined analytically, exists in the proportions by weight of about 54.5% trans,trans - stereoisomer, and about 38.5% cis,trans-stereoisomer and about 7% cis,cis-stereoisomer.

It will be understood also that this invention makes it possible to take a mixture of 37% by weight of the trans,trans-stereoisomer, 55% by weight of the cis,trans-stereoisomer, and 8% by weight of the cis,cis-stereoisomer of PACM and convert this mixture readily to a mixture of 53% trans,trans-stereoisomer, 40% cis,trans-stereoisomer and 7% cis,cis-stereoisomer. In the other direction from the equilibrium concentration, it is equally simple according to the present invention to take an isomeric mixture containing about 70% by weight of the trans,trans-stereoisomer of PACM, about 25% of the cis,trans-stereoisomer of PACM and the remaining 5% of the cis,cis-stereoisomer, and convert this mixture according to the process of the present invention to a mixture containing these three stereoisomers, respectively, in the proportions of approximately 54:40:6.

According to this invention, the starting PACM stereoisomer mixture not at equilibrium concentration is subjected to hydrogenation conditions using hydrogen at elevated temperatures and pressure, optionally in a liquid solvent system, in the absence of added ammonia and the presence of a ruthenium catalyst supported on calcium carbonate, a single rare earth oxide or carbonate, a mixture of rare earth oxides or carbonates, or a mixture of rare earth oxides and carbonates.

It is important to emphasize that the starting PACM is fully saturated, i.e. fully hydrogenated, and therefore the process of the invention is not merely a simple hydrogenation reaction. For some reason not fully understood, the particular combination of hydrogenating conditions using hydrogen at an elevated temperature and in the critical presence of a ruthenium catalyst supported on calcium carbonate, a rare earth oxide, a rare earth carbonate or a mixed oxide-carbonate, causes a shift of stereoisomer ratio towards the equilibrium concentration.

The process is carried out for a time sufficient to reach a desired stereoisomeric ratio or content. Most frequently, it will be desired to attain the equilibrium concentration and this can readily be reached in less than one hour, and ordinarily less than 30 minutes. Once a desired stereoisomeric ratio or content is achieved, additional holdup or exposure under the isomerization conditions of this invention serve no particular purpose.

The starting PACM stereoisomer or mixture of stereoisomers can be obtained in any suitable way. For example, the methods of Whitman, U.S. Pat. No. 2,606,924, produce a normally liquid mixture of stereoisomeric PACM high in cis,trans-stereoisomer content that can readily be converted by the present invention to a mixture approaching or at the equilibrium concentration.

The starting PACM can also have present up to about 20% or more of 2,4' - methylenedi(cyclohexylamine) which is more simply referred to as 2,4'-PACM.

The ruthenium catalyst supported on calcium carbonate, a rare earth oxide, a rare earth carbonate, or a mixed oxide-carbonate will be used according to the present invention in an amount of at least 0.001 weight percent and less than about 10%, based on the starting PACM and calculated as metallic ruthenium, and preferably in amounts of from 0.01 to 1% on the same basis.

The ruthenium is extended on a carrier selected from the group consisting of calcium carbonate, and single or mixed oxides, carbonates, or mixed oxide-carbonates of rare earth metals such as lanthanum, cerium, praseodymium, neodymium, promethium, samarium, europium, gadolinium, terbium, dysprosium, holmium, erbium, thulium, ytterbium, lutetium and yttrium. Such rare earth oxides normally will contain some of the corresponding rare earth carbonates when the carbonates are the oxide precursors. Such extended catalysts can be prepared, for example, by slurrying the support in an aqueous ruthenium chloride solution, precipitating the ruthenium values with aqueous ammonium bicarbonate, digesting at 60–90° C., filtering, washing, drying, and activating by means well known in the art. Methods of preparing ruthenium catalysts extended on single and mixed rare earth oxides, carbonates and mixed oxide-carbonates are more fully set forth in Stiles U.S. Pat. No. 3,404,098.

If desired, the extended catalyst may be treated with a basic alkali metal compound, either before or during the process of the invention. Examples of such compounds are the hydroxides, bicarbonates, carbonates, and alkoxides of sodium, potassium, lithium, cesium and rubidium and sodamide.

As was previously mentioned, this process can be carried out in the presence of a solvent for the PACM. The solvents which can be optionally used according to this invention are generally organic solvents which are not subject to hydrogenation under the conditions of this process. In general, saturated alicyclic and aliphatic solvents are suitable including alicyclic and aliphatic hydrocarbon ethers. Representative of suitable solvents are n-hexane, cyclohexane, dioxane, ethyl ether, isopropyl ether, n-propyl ether, n-butyl ether, isobutyl ether, and amyl ethers, tetrahydrofuran, dicyclohexyl ether, and the like. Such alcohols as methyl alcohol, ethyl alcohol, and isopropyl alcohol can also be used.

The process of this invention is carried out at elevated temperatures and pressures. Temperatures on the order of 150° to 300° C. and preferably about 200° to 245° C. should be used.

The process is ordinarily run at hydrogen partial pressures above about 50 pounds per square inch and preferably from about 500 to 5500 pounds per square inch. Higher hydrogen partial pressures can, of course, be used but little practical advantages are seen from this. Similarly, lower hydrogen partial pressures can be used, pressures as low as 1 p.s.i. still permitting smooth operation. However, yields generally are somewhat poorer at these low hydrogen pressures so that they are ordinarily avoided. Ordinarily, total pressures during isomerization range from about 500 to about 15,000 pounds per square inch, these being practical limits for reasons of cost of operation and equipment.

It will be understood by those skilled in the art that this process can be carried out in a batch operation, or in a continuous or semi-continuous operation. It will also be understood that in a continuous process utilizing thorough back-mixing, the quantities of catalyst used will still be within the range set out above, but the quantities will be calculated on the basis of total reactor content rather than on the basis of initial charge.

It will also be readily appreciated that the process for the hydrogenation of 4,4'-methylenedianiline to PACM, wherein hydrogenation is effected at elevated temperature and pressure and using a ruthenium catalyst supported on calcium carbonate or a rare earth oxide, carbonate or oxide-carbonate, can encompass a recycle of part or all of the PACM back into the reaction zone where it is subjected to the critical conditions of the process of the present invention.

Such a recycle operation in PACM manufacture thus permits the preparation of a PACM product at or very close to the equilibrium concentration, and this can also be followed by crystallization to produce a material high in the trans,trans-stereoisomer. The mother liquor remaining after crystal removal, which is rich in cis,trans-stereoisomer and not useful for the identical purposes as the PACM at equilibrium concentration or at higher than equilibrium trans,trans-esteroisomer concentrations, is readily recycled back into the main reaction where it is subjected to the conditions of the present invention and rapidly converted to the desired concentration. The reverse is also possible: that is, to retain the liquid or high cis,trans-stereoisomer mixture and recycle the high trans, trans-stereoisomer fraction for isomerization back to equilibrium concentration. Over-all, this achieves a remarkably high yield of the desired product with production of little or no unwanted by-product.

In a recycle operation the amount of material being recycled will, of course, depend on the amount of undesired stereoisomers present as co-products. It will be understood that there will ordinarily be a larger amount of recycle in those operations where the PACM originally produced is farther away from the equilibrium concentration of the mixture of stereoisomers or where the desired stereoisomer content to be obtained by a subsequent separation process is farther from the equilibrium.

The usefulness of equilibrium concentration mixtures of stereoisomeric PACM is well known. Reaction of such PACM with sebacic acid forms polyamides of high melting point.

This invention will be better understood by reference to the following illustrative examples wherein parts and percentages are by weight unless otherwise specified.

EXAMPLE 1

At a temperature of 225° C. and a total pressure of 5000 pounds per square inch gage, 50 parts of dioxane and 100 parts of 4,4'-methylenedi(cyclohexylamine) containing about 13% cis,cis-, 60% cis,trans- and 27% trans,trans-stereoisomers is subjected to an atmosphere of hydrogen in the presence of 10 parts of a catalyst comprising about 5% ruthenium on calcium carbonate for 30 minutes. The resulting mixture is freed of catalyst by filtration and distilled to strip off solvent. Final distillation under vacuum gives the fully saturated mixture of stereoisomers of 4,4' - methylenedi(cyclohexylamine) and by-product impurities in an amount of less than 1.0% based on the saturated compound added. The resulting product isomer content is 10.4% cis,cis-, 43.8% cis,trans- and 45.8% trans,trans-stereoisomers.

EXAMPLE 2

At a temperature of 225° C. and a hydrogen pressure of 5000 pounds per square inch gage, 50 parts of n-butyl ether, and 100 parts of 4,4' - methylenedi(cyclohexylamine) containing about 13% cis,cis-, 60% cis,trans-, and 27% trans,trans-stereoisomers is subjected to an atmosphere of hydrogen for 30 minutes in the presence of 10 parts of a catalyst comprising about 5% ruthenium on a support of rare earth oxides.

The rare earth oxide support is prepared by calcining at 400° C. for three hours a commercially available mixture of rare earth hydroxy carbonates of the following composition calculated as the oxides on a $CO_2$ free basis:

|  | Percent |
|---|---|
| $CeO_2$ | 47 |
| $La_2O_3$ | 24.5 |
| $Nd_2O_3$ | 19.5 |
| $Pr_2O_3$ | 6.0 |
| $Sm_2O_3$ | 2.0 |
| $Gd_2O_3$ | 0.5 |
| Other rare earths | 0.5 |

The $CO_2$ content of the rare earth oxides after calcination is about 37% of that amount which would be required to combine with all the rare earth metals as carbonates.

The hydrogenated mixture is freed of catalyst by filtration and distilled to strip off solvent. Final distillation under vacuum gives the fully saturated mixture of stereoisomers of 4,4'-methylenedi(cyclohexylamine) and by-product impurities in an amount of less than 0.7% based on the saturated compound added. The resulting product isomer content is 9.2% cis,cis-, 41.5% cis,trans- and 49.3% trans,trans-stereoisomers.

EXAMPLE 3

At a temperature of 245° C., and a total pressure of 4000 p.s.i.g., 500 parts of 4,4'-methylenedi(cyclohexylamine) containing about 2% cis,cis-, 20% cis,trans-, and 78% trans,trans-stereoisomers is subjected to an atmosphere of hydrogen for 10 minutes in the presence of 10 parts of a catalyst comprising 4% ruthenium on rare earth oxides.

The rare earth oxide support is prepared by calcining at 500° C. for three hours a commercially available mixture of rare earth hydroxy carbonates of the following composition, calculated as the oxides on a $CO_2$ free basis:

|  | Percent |
|---|---|
| $CeO_2$ | 48 |
| $La_2O_3$ | 34 |
| $Pr_2O_3$ | 4 |
| $Nd_2O_3$ | 13 |
| $Sm_2O_3$ | 0.6 |
| $Eu_2O_3$ | 0.15 |
| $Gd_2O_3$ | 0.30 |
| $Y_2O_3$ | 0.13 |
| $Pm_2O_3$, $Tb_2O_3$, $Dy_2O_3$, $Ho_2O_3$, $Er_2O_3$, $Tm_2O_3$, $Yb_2O_3$, $Lu_2O_3$ | 0.30 |

The $CO_2$ content of the calcined rare earth oxides is about 21% of the theoretical amount required to form carbonates with all the rare earth metals.

The resulting hydrogenated mixture is freed of catalyst by filtration and distilled under vacuum to give the fully saturated mixture of stereoisomers of 4,4'-methylenedi(cyclohexylamine) and a small amount of by-product impurities. The resulting product isomer content is 6% cis,cis-, 36% cis,trans-, and 58% trans,trans-stereoisomers.

EXAMPLE 4

At a temperature of 290° C. and a hydrogen pressure of 1000 p.s.i.g., 100 parts of 4,4'-methylenedi(cyclohexylamine) containing about 1% cis,cis-, 8% cis,trans-, and 91% trans,trans-stereoisomers is subjected to an atmosphere of hydrogen in the presence of 25 parts of a catalyst comprising 5% ruthenium on calcium carbonate for 3 minutes. The resulting mixture is freed of catalyst by filtration and distilled under vacuum to give the fully saturated mixture of stereoisomers of 4,4'-methylenedi(cyclohexylamine) and by-product impurities in an amount of less than 1.5% based on the saturated compound added. The resulting product isomer content is 7% cis,cis-, 38.5% cis,trans-, and 54.5% trans,trans-stereoisomers.

EXAMPLE 5

At a temperature of 180° C. and a total pressure of 10,000 p.s.i.g., 100 parts of 4,4'-methylenedi(cyclohexylamine) containing about 18% cis,cis-, 50% cis,trans-, and 32% trans,trans-stereoisomers is subjected to an atmosphere of hydrogen for 60 minutes in the presence of 100 parts of a catalyst comprising 5% ruthenium on rare earth oxides.

The rare earth oxide support has the following composition calculated as the oxides on a $CO_2$ free basis:

|  | Percent |
|---|---|
| Cerium oxide | 62 |
| Praseodymium oxide | 19 |
| Lanthalum oxide | 19 |

The hydrogenated mixture is freed of catalyst by filtration and distilled under vacuum to give the fully saturated mixture of stereoisomers of 4,4'-methylenedi(cyclohexylamine) and a small amount of by-product impurities. The resulting product isomer content is 8% cis,cis-, 40% cis,trans-, and 52% trans,trans-stereoisomers.

EXAMPLE 6

At a temperature of 230° C. and a hydrogen pressure of 500 p.s.i.g., 100 parts of isopropyl ether and 200 parts of 4,4'-methylenedi(cyclohexylamine) containing about 12% cis,cis-, 68% cis,trans-, and 20% trans,trans-stereoisomers is subjected to an atmosphere of hydrogen in the presence of 10 parts of 5% ruthenium on calcium carbonate catalyst. The resulting mixture is freed of catalyst by filtration and distilled to strip off solvent. Final distillation under vacuum gives the fully saturated mixture of stereoisomers of 4,4'-methylenedi(cyclohexylamine) and by-product impurities in an amount of less than 2.0% based on the saturated compound added. The resulting product isomer content is 8% cis,cis-, 42% cis,trans-, and 50% trans,trans-stereoisomers.

EXAMPLE 7

At a temperature of 215° C. and a total pressure of 4500 p.s.i.g., 200 parts of dioxane and 1000 parts of 4,4'-methylenedi(cyclohexylamine) containing about 15% cis,cis-, 68% cis,trans-, and 17% trans,trans-stereoisomers is subjected to an atmosphere of hydrogen for 40 minutes in the presence of 10 parts of a catalyst comprising 1% ruthenium on a cerium oxide support which contains about 46% of the $CO_2$ required to form cerium carbonate. The hydrogenated mixture is freed of catalyst by filtration and distilled under vacuum giving the fully saturated mixture of stereoisomers of 4,4'-methylenedi(cyclohexylamine) and by-product impurities in an amount of less than 1% based on the saturated compound added. The resulting product isomer content is 7% cis,cis-, 38.5% cis,trans-, and 54.5% trans,trans-stereoisomers.

EXAMPLE 8

At a temperature of 250° C. and a total pressure of 2500 p.s.i.g., 100 parts of 4,4'-methylenedi(cyclohexylamine) containing about 13% cis,cis-, 60% cis,trans-, and 27% trans,trans-stereoisomers is subjected to an atmosphere of hydrogen for 15 minutes in the presence of 1 part sodium methoxide and 10 parts of a catalyst comprising 5% ruthenium on lanthanum oxide support which contains about 60% of the $CO_2$ required to form lanthanum carbonate. The hydrogenated mixture is freed of catalyst by filtration and distilled under vacuum to give the fully saturated mixture of stereoisomers of 4,4'-methylenedi(cyclohexylamine) and by-product impurities in an amount of less than 2.0% based on the saturated compound added. The resulting product isomer content is 7% cis,cis-, 38.5% cis,trans-, and 54.5% trans,trans-stereoisomers.

EXAMPLE 9

At a temperature of 225° C. and a total pressure of 5000 p.s.i.g., 100 parts of 4,4'-methylenedi(cyclohexylamine) containing about 12% cis,cis-, 68% cis,trans-, and 20% trans,trans-stereoisomers and 10 parts of 2,4'-methylenedi(cyclohexylamine) are subjected to an atmosphere of hydrogen for 20 minutes in the presence of 10 parts of a catalyst comprising 5% ruthenium on the mixed rare earth oxides of Example 2. The resulting mixture is freed of catalyst by filtration and distilled under vacuum, the fraction containing the fully saturated mixture of stereoisomers of 4,4'-methylenedi(cyclohexylamine) and a small amount of by-product impurities. Isomer content is 10% cis,cis-, 41% cis,trans- and 49% trans,trans-stereoisomer.

EXAMPLE 10

In a steel autoclave fitted with a stirring apparatus and a product drawoff system retaining the catalyst in the reactor, there is placed 2000 parts of 4,4'-methylenedi(cyclohexylamine) and 100 parts of a finely divided 5% ruthenium on a calcium carbonate support. The materials are heated at 225° C. with stirring and hydrogen is added to maintain a pressure of 290 atmospheres. The 4,4'-methylenedi(cyclohexylamine) containing about 1% cis,cis-, 10% cis,trans-, and 89% trans,trans-streoisomers is fed at such a rate to maintain a 180 minute resident time while product is drawn off through a filter to maintain a fixed reactor volume. Distillation under vacuum gives the fully saturated mixture of stereoisomers of 4,4'-methylenedi(cyclohexylamine) and by-product impurities in an amount of less than 2% based on the material charged. The resulting product isomer content is 8% cis,cis-, 39% cis-, 10% cis,trans-, and 89% trans,trans-stereoisomers is

EXAMPLE 11

In a steel autoclave fitted with a stirring apparatus and a product drawoff system retaining the catalyst in the reactor, there is placed 2000 parts of 4,4'-methylenedi(cyclohexylamine), 60 parts of a finely divided 4% ruthenium on the mixed rare earth oxide support of Example 3. The material is heated to 235° C. with stirring and hydrogen added to maintain a pressure of 290 atmospheres. A mixture of 65% para,para'-methylenedianiline and 35% of a 4,4'-methylenedi(cyclohexylamine) containing about 11% cis,cis-, 58% cis,trans-, and 31% trans,trans-stereoisomers is fed at such a rate as to maintain a 55 minute resident time while product is drawn off to maintain a fixed reactor volume. The resulting product is distilled under vacuum to give the fully saturated mixture of stereoisomers of 4,4'-methylenedi(cyclohexylamine) and a small amount of by-product impurities. The resulting product isomer content is 9% cis,cis-, 43% cis,trans- and 47% trans,trans-stereoisomers.

EXAMPLE 12

At a temperature of 225° C. and a total pressure of 50 pounds per square inch gage, 2000 parts of 4,4'-methylenedi(cyclohexylamine) containing about 11% cis,cis-, 58% cis,trans-, and 31% trans,trans-stereoisomers, is subjected to an atmosphere of hydrogen in the presence of 60 parts of a catalyst comprising 5% ruthenium on calcium carbonate. The resulting mixture is freed of catalyst by filtration. The product contains little by-product impurities and has a stereoisomer content of 8.2% cis,cis-, 42.9% cis,trans, and 48.9% trans,trans-stereoisomers.

What is claimed is:

1. A process for altering the isomer ratio of a mixture of stereoisomers of 4,4'-methylenedi(cyclohexylamine), said mixture initially not being at the equilibrium concentration of stereoisomeric 4,4-methylenedi(cyclohexylamine), and bringing said mixture closer to the equilibrium concentration, said process comprising subjecting to a temperature of from 150 to 300° C. and a total pressure of 500 to 15,000 pounds per square inch a reaction mixture consisting essentially of the following components:
    (a) the mixture of stereoisomers of 4,4'-methylenedi(cyclohexylamine) not of equilibrium,
    (b) gaseous hydrogen at a hydrogen partial pressure of from 50 to 5,500 pounds per square inch, and
    (c) 0.001 to 10% by weight of a ruthenium catalyst calculated as ruthenium and based on the weight of the 4,4'-methylenedi(cyclohexylamine), said ruthenium catalyst being supported on a material selected from the group consisting of calcium carbonate, rare earth oxides, rare earth carbonates, mixed rare earth oxide-carbonates, and their mixtures.

2. The process as set forth in claim 1 wherein said process is carried out in a liquid inert organic solvent.

3. The process of claim 1 wherein the hydrogen partial pressure is from 500 to 5,500 pounds per square inch and the temperature is between about 200° C. and 245° C.

4. The process of claim 3 wherein said process is carried out in an inert liquid organic solvent.

5. The process of claim 3 wherein the catalyst is supported on calcium carbonate.

6. The process of claim 3 wherein the catalyst is supported on a material selected from the group consisting of the rare earth oxides, rare earth carbonates, mixed rare earth oxide-carbonates and their mixtures.

7. The process of claim 3 wherein the catalyst is present in amounts ranging from 0.01 to 1% by weight calculated as ruthenium and based on the weight of 4,4'-methylenedi(cyclohexylamine).

8. The process of claim 7 wherein said process is carried out in an inert liquid organic solvent.

References Cited
UNITED STATES PATENTS

| | | | |
|---|---|---|---|
| 3,155,724 | 11/1964 | Arthur | 260—563 B |
| 3,177,258 | 4/1965 | Rylander et al. | 260—563 B |

LEWIS GOTTS, Primary Examiner

D. R. PHILLIPS, Assistant Examiner

U.S. Cl. X.R.

252—402, 443, 472; 260—563 D